United States Patent
Nakajima (10) Patent No.: US 7,473,293 B2
(45) Date of Patent: Jan. 6, 2009

(54) PROCESSOR FOR EXECUTING INSTRUCTIONS CONTAINING EITHER SINGLE OPERATION OR PACKED PLURALITY OF OPERATIONS DEPENDENT UPON INSTRUCTION STATUS INDICATOR

(75) Inventor: Masami Nakajima, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 133 days.

(21) Appl. No.: 11/520,616

(22) Filed: Sep. 14, 2006

(65) Prior Publication Data
US 2007/0074010 A1    Mar. 29, 2007

(30) Foreign Application Priority Data
Sep. 29, 2005    (JP) .............................. 2005-284145

(51) Int. Cl.
    G06F 9/30    (2006.01)
(52) U.S. Cl. ...................... 71/210; 712/204; 712/209
(58) Field of Classification Search ................. 712/210, 712/226, 24, 209
    See application file for complete search history.

(56) References Cited
    U.S. PATENT DOCUMENTS
    2003/0033504 A1 *    2/2003    Yamada et al. .............. 712/210

OTHER PUBLICATIONS

Kubosawa et al., A 1.2-W, 2.16GOPS/720-MFLOPS Embedded Superscalar Microprocessor for Multimedia Applications, IEEE Journal of Solid-State Circuits, vol. 33, Issue 11, Nov. 1998.*
Bird et al., An Instruction Stream Compression Technique, EECS Department, University of Michigan, Nov. 27, 2006.*
Shoemaker, The IBM Personal Computer from the Inside Out, revised edition, 1986, pp. 218.*
Mano, M. Morris, Digital Design, Prentice-Hall, Inc., 1984, pp. 256-257, and 289.*
David A. Patterson et al., "Computer Organization & Design," The Hardware/Software Interface, Second Edition, May 17, 1999, pp. 486-491, Nikkei Business Publications, and English summary thereof.
Akira Nakamori, "Introduction to Microprocessor Architecture," Apr. 1, 2004, pp. 200-203, CQ Publishing, and English summary thereof.

* cited by examiner

*Primary Examiner*—Richard Ellis
(74) *Attorney, Agent, or Firm*—Buchanan Ingersoll & Rooney PC (57) ABSTRACT

A conversion table converts a packed instruction (pre-conversion code) contained in the instruction code fetched from an instruction memory into a plurality of instruction codes (converted codes). An instruction decoder decodes the plurality of the instruction codes converted by a conversion table. A plurality of ALUs perform the operation in accordance with the decoding result of the instruction decoder. Therefore, the number of instructions that can be executed in parallel per cycle may be increased while at the same time the capacity of the instruction memory is reduced.

13 Claims, 9 Drawing Sheets

| | | T1 | T2 | T3 | T4 | T5 | T6 | T7 |
|---|---|---|---|---|---|---|---|---|
| JUMP FREE OF PENALTY | ISSUE ADDRESS | 1 | 2 | J1+1 | J1+2 | J1+3 | | |
| | FETCH INSTRUCTION | | 1 | J1 | J1+1 | J1+2 | J1+3 | |
| | EXECUTE | | | 1(jmp) | J1 | J1+1 | J1+2 | J1+3 |
| JUMP (NORMALLY) | ISSUE ADDRESS | 1 | 2 | J1 | J1+1 | J1+2 | | |
| | FETCH INSTRUCTION | | 1 | NOP | J1 | J1+1 | J1+2 | |
| | EXECUTE | | | 1(jmp) | NOP | J1 | J1+1 | J1+2 |

PROCESSOR FOR EXECUTING INSTRUCTIONS CONTAINING EITHER SINGLE OPERATION OR PACKED PLURALITY OF OPERATIONS DEPENDENT UPON INSTRUCTION STATUS INDICATOR

BACKGROUND OF THE INVENTION

1. Field of the Invention

This invention relates to a processor for processing a plurality of instructions in parallel, and in particular to a processor for processing an instruction set of a plurality of instructions packed into a single code.

2. Description of the Background Art

In recent years, with the spread of portable terminal devices, the digital signal processing for processing a great amount of data such as voices and images at high speed has become increasingly important. A DSP (digital signal processor) is typically used as a semiconductor device exclusive to such digital signal processing. However, in the case where an amount of data to be processed is enormous, it is difficult to improve the performance dramatically even with the use of an exclusive DSP. Assuming that ten thousand sets of data are to be arithmetically processed, for example, at least ten thousand cycles are required even if the operation on each set of data can be executed in a single machine cycle. In other words, each set of data may be processed at high speed, but the time required for processing increases in proportion to the amount of data because the data processing is in series.

In the case where an amount of data to be processed is large, the processing performance can be improved by parallel operation. Specifically, a plurality of operation units are prepared and operated at the same time to process a plurality of sets of data at the same time. In the case where the same operation is performed on a plurality of sets of data, the method called SIMD (single instruction-multiple data streams) can be employed to reduce the area of the operation unit while maintaining a high parallel performance. Specifically, while a plurality of data processors are prepared, a high performance with a small area can be exhibited by providing a common control unit for interpreting an instruction and controlling the process.

Document 1 (D. A. Patterson and J. L. Hennessy, "Computer Organization and Design", Nikkei Business Publications) describes a method of decreasing the length of an instruction code to reduce the size of the instruction memory.

Document 2 (Akira Nakamori, "Introduction to Microprocessor Architecture", CQ Publishing), on the other hand, describes a method in which a plurality of slots are formed in one instruction format for parallel execution by VLIW (very long instruction word) in order to increase the number of instructions that can be executed per cycle.

However, reducing the size of the instruction memory as described in Document 1 and increasing the number of instructions that can be executed per cycle as described in Document 2 are in the relation of so-called tradeoff.

Specifically, according to the method described in Document 1, it is possible to reduce the size of the instruction memory, while the fact that a plurality of instructions are processed in series poses a problem that a number of cycles are required to execute the instructions. Taking an example where the instruction code length is 16 bits, the instruction length is short but four cycles are required to execute four instructions.

According to the method described in Document 2, on the other hand, more instructions may be executed per cycle, while the instruction length is increased and so is the size of the instruction memory. In the case where four slots of 16 bits are provided, for example, four instructions can be executed at the same time in a single cycle at the sacrifice of an extended instruction code length of 64 bits.

SUMMARY OF THE INVENTION

An object of this invention is to provide a processor in which the number of instructions capable of being executed in parallel per cycle is increased while at the same time reducing the capacity of an instruction memory.

According to one aspect of the invention, there is provided a processor including an instruction memory for storing an instruction code, a converter for converting a packed instruction contained in an instruction code fetched from the instruction memory into a plurality of instruction codes, a decoder for decoding the plurality of the instruction codes converted by the converter, and a plurality of operation units for executing the operation corresponding to each of the plurality of the instruction codes in accordance with the decoding result of the decoder.

In view of the fact that the converter converts a packed instruction contained in an instruction code fetched from the instruction memory into a plurality of instruction codes and the decoder decodes the plurality of the instruction codes converted by the converter, thereby causing the plurality of the operation units to execute the operations, the number of instructions that can be executed in parallel per cycle can be increased while at the same time reducing the capacity of the instruction memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1A:
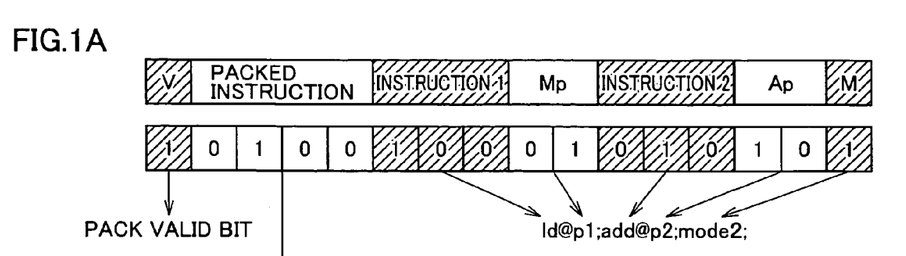
FIGS. 1A and 1B are diagrams showing an example of the structure of an instruction code used for a processor according to a first embodiment of the invention.
Figure 1B:
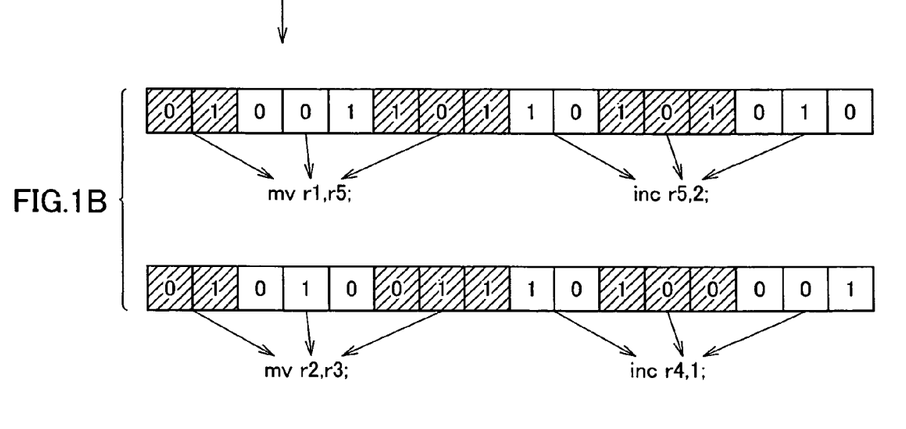

FIGS. 1A and 1B are diagrams showing an example of the structure of an instruction code used for the processor according to the first embodiment of the invention. As shown in FIG. 1A, this instruction code includes a pack valid bit (V) indicating a packed instruction, a packed instruction, an operation code and an operand Mp of an instruction 1, an operation code and an operand Ap of an instruction 2 and a mode bit (M) indicating the operation mode of the processor. A "ld @p1" is an instruction for loading the data from an address indicated by a register p1, and an "add @p2" is an instruction for adding the data stored at the address indicated by a register p2 and the data stored in, for example, an accumulator.

In the case where the pack valid bit is a valid "1", a plurality of instructions are selected in accordance with a 4-bit packed instruction as described later. In the case where the packed instruction is "0100", for example, four instructions including "mv r1, r5", "inc r5, 2", "mv r2, r3" and "inc r4, 1" are selected as shown in FIG. 1B. The "mv" instruction is for data transfer between registers, and the "inc" instruction is for incrementing the contents of the register.

In the case where the pack valid bit is invalid "0", a 4-bit packed instruction is processed as one instruction.

Figure 2:
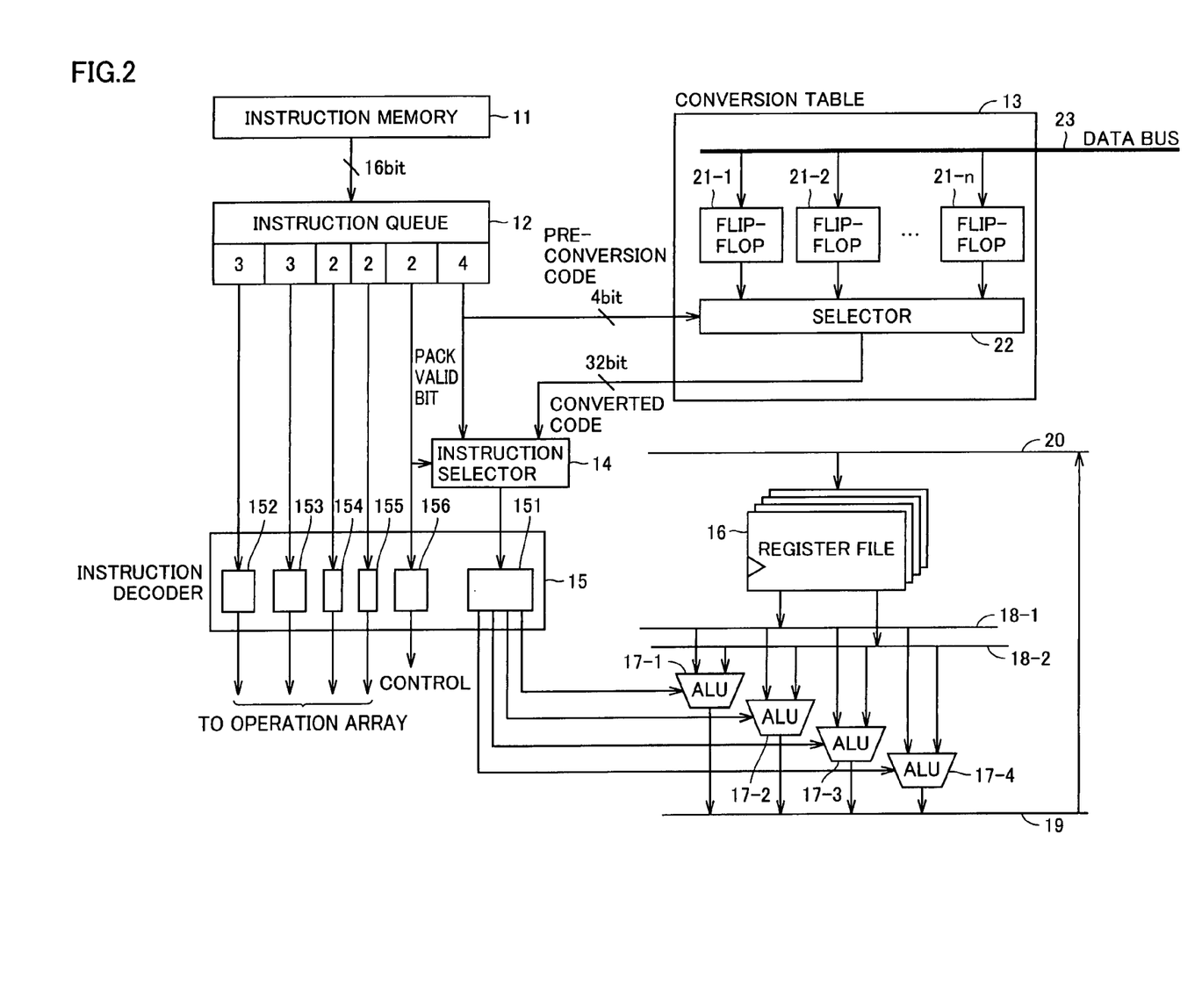
FIG. 2 is a block diagram showing a schematic configuration of the processor according to the first embodiment of the invention.

FIG. 2 is a block diagram showing a general configuration of a processor according to the first embodiment of the invention. This processor includes an instruction memory 11, an instruction queue 12, a conversion table 13 for converting a packed instruction into a plurality of instruction codes and outputting the instruction codes, an instruction selector 14 for selectively outputting a plurality of converted instruction codes from conversion table 13 and a packed instruction from instruction queue 12 in accordance with the pack valid bit, an instruction decoder 15, a register file 16 and ALUs 17-1 to 17-4.

Instruction memory 11 stores a program to be executed by the processor. Instruction queue 12 temporarily stores the instruction code fetched from instruction memory 11. Of the 16-bit instruction code stored in instruction queue 12, the packed instruction is applied to conversion table 13 and instruction selector 14 as a 4-bit pre-conversion code. The remaining 12 bits are applied directly to instruction decoder 15.

Conversion table 13 includes a plurality of flip-flops 21-1 to 21-$n$ connected to a data bus 23 and a selector 22 for selecting the outputs of flip-flops 21-1 to 21-$n$ in accordance with a 4-bit pre-conversion code received from instruction queue 12.

Flip-flops 21-1 to 21-$n$ each store a converted 32-bit code including a plurality of instructions through data bus 23. Data bus 23 is connected to the output port, for example, of a computer not shown, and the user can write contents of conversion table 13 from outside. The flip-flops are arbitrary in number, and each corresponds to a 4-bit pre-conversion code. Specifically, in the case where the pre-conversion code is 4 bits, up to 16 flip-flops may be included. The pre-conversion code is not limited to 4 bits, but the number of corresponding flip-flops can be increased by increasing the number of bits.

The 32-bit converted code selected by selector 22 is applied to instruction selector 14. In the case where the pack valid bit is a valid "1", instruction selector 14 selects the 32-bit converted code received from selector 22 and outputs it to instruction decoder 15, while in the case where the pack valid bit is invalid "0", on the other hand, the 4-bit packed instruction is selected and output to instruction decoder 12. In this case, the 4-bit packed instruction is processed as a single instruction code.

Instruction decoder 15 includes a plurality of decode blocks 151 to 156. In the case where the pack valid bit is a valid "1", block 151 individually decodes the four instruction codes received from instruction selector 14, and applies the decoding result to ALUs 17-1 to 17-4. In the case where the pack valid bit is an invalid "0", on the other hand, the result of decoding the one instruction code received from instruction selector 14 is applied to any one of ALUs 17-1 to 17-4 and only one ALU is caused to execute the operation.

Blocks 152 and 153 decode the operation code of instruction 1 and the operation code of instruction 2, respectively, and output the decoding result as a control signal to an operation array not shown. Blocks 154 and 155, on the other hand, decode the operand portion of instruction 1 and the operand portion of instruction 2, respectively, and output the decoding result as a control signal to an operation array not shown.

Block 156 decodes pack valid bit (v) and mode bit (M), and applies the decoding result as a control signal to each block of the processor.

Register file 16 is a group of registers for holding the data to be operated and the data constituting the result of operation. ALUs 17-1 to 17-4 receive the decoding result from instruction decoder 15, and while accessing the data held in register file 16 through common buses 18-1 and 18-2, executes the parallel operation. ALUs 17-1 to 17-4 can read the data at the same time from register file 16 through common buses 18-1 and 18-2.

Register file 16 receives and stores the results of the operations of ALUs 17-1 to 17-4 through common buses 19 and 20. The decoding result applied from instruction decoder 15 to ALUs 17-1 to 17-4 includes an operand as shown in FIG. 1B.

As explained above, with the processor according to this embodiment, in the case where the pack valid bit is a valid "1", conversion table 1 selects a plurality of instruction codes in accordance with the packed instruction, instruction selector 14 selects and outputs the converted code containing a plurality of the instruction codes output from conversion table 13, and instruction decoder 15 decodes the plurality of the instruction codes and causes a plurality of the ALUs to execute the operations. In this way, a plurality of instructions can be packed into a single instruction code and the instruction memory can be reduced in size, while at the same time increasing the number of instructions that can be executed in one cycle.

Also, the operation can be executed at higher speed, and the power consumption required to fetch the instruction code can be reduced.

Also, a plurality of the instructions stored in flip-flops 21-1 to 21-$n$ can be changed in accordance with the execution program. By incorporating an instruction set suitable for the program in flip-flops 21-1 to 21-$n$, therefore, the operation can be executed at higher speed.

Second Embodiment

In the first embodiment of the invention, the user writes an instruction set in conversion table 13 from outside. According to the second embodiment, in contrast, a compiler implemented by the computer writes an instruction set in conversion table 13.

The general configuration of the processor according to this embodiment is similar to that of the processor according to the first embodiment shown in FIG. 2. Therefore, similar or identical component parts of the configuration and functions are not described in detail again.

Figure 3:
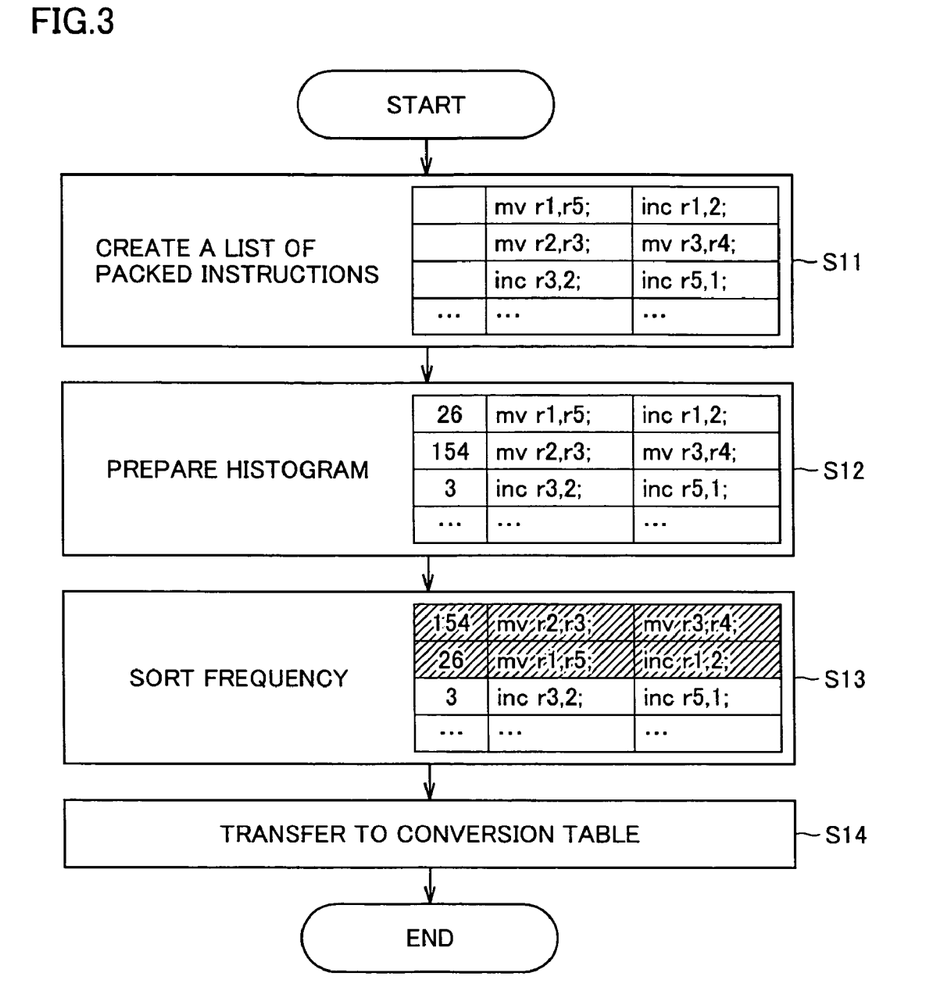
FIG. 3 is a flowchart for explaining the processing steps in a compiler for writing an instruction set in a conversion table 13 of the processor according to a second embodiment of the invention.

FIG. 3 is a flowchart for explaining the steps of the process executed by the compiler for writing an instruction set in conversion table 13 of the processor according to the second embodiment of the invention. First, the compiler prepares a list of packed instructions (a plurality of instruction codes executed in parallel) from the instruction code described in a program (S11), and generates a histogram according to the frequency of occurrence of the packed instruction (S12).

As indicated in step S12 of FIG. 3, the frequency of occurrence of "mv r1, r5; inc r1, 2; . . . " is 26, the frequency of occurrence of "mv r2, r3; mv r3, r4; . . . " is 154 and the frequency of occurrence of "inc r3, 2; inc r5, 1; . . . " is 3.

Next, in accordance with the frequency of occurrence of the packed instruction, the sorting is carried out (S13), a plurality of the instruction codes are transferred to flip-flops 21-1 to 21-*n* in the descending order of the frequency of occurrence (S14) thereby to complete the process. The plurality of the instruction codes, like in the first embodiment, are transferred to conversion table 13, for example, through the output port of the computer, not shown, connected to data bus 23.

In the compiler, a packed instruction is assigned to the plurality of the instruction codes in accordance with which one of flip-flops 21-1 to 21-*n* the plurality of the instruction codes are transferred to, and the program instruction is converted to a machine language using the particular packed instruction.

As explained above, in the processor according to this embodiment, a plurality of the instruction codes determined as high in the frequency of occurrence by the compiler are packed and a plurality of the instruction codes are written in conversion table 13. In addition to the effects explained with reference to the first embodiment, therefore, a group of instructions high in compression efficiency can be packed and the instruction memory can be further reduced in size.

Third Embodiment

Figure 4:
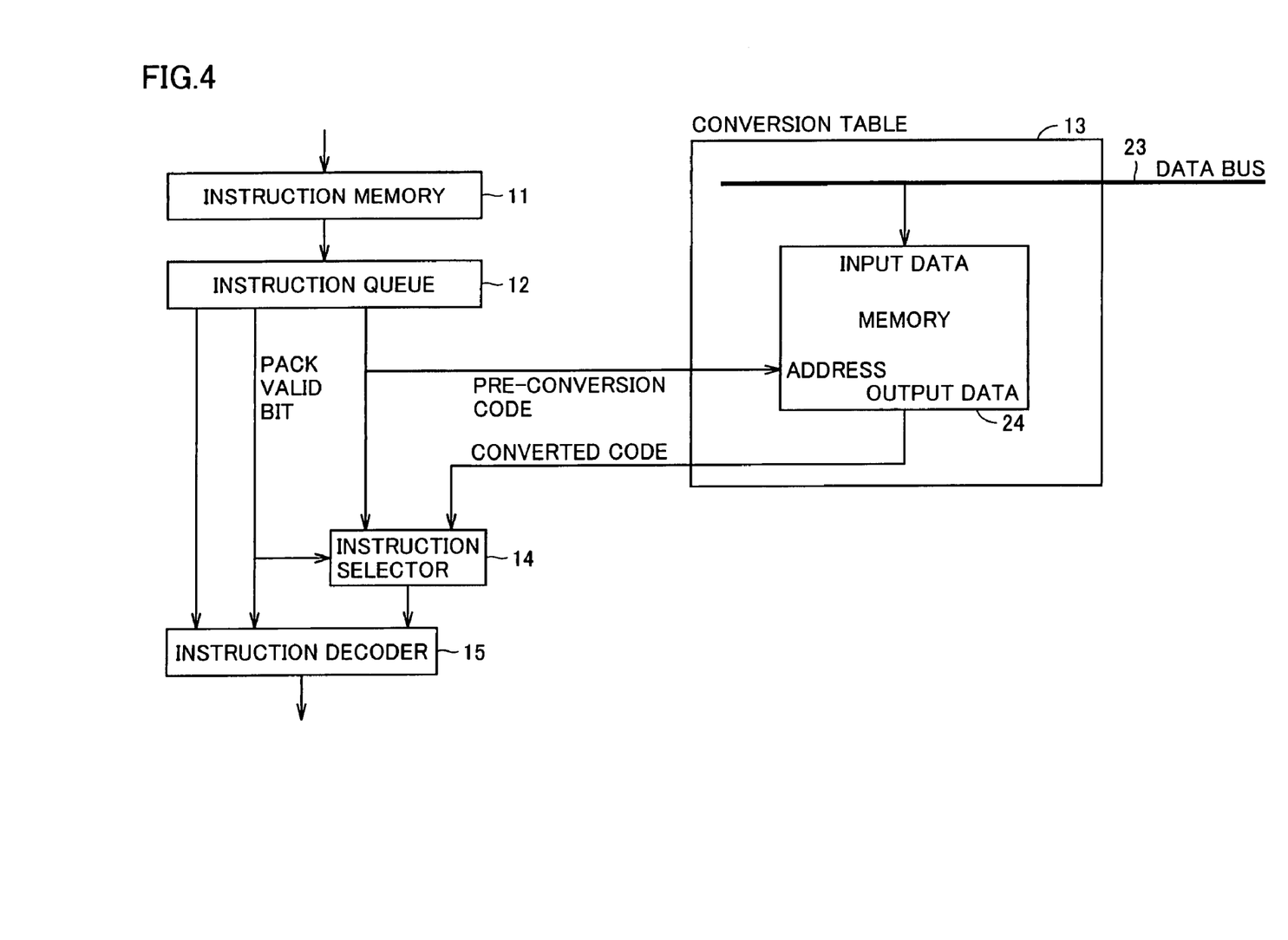
FIG. 4 is a block diagram showing a schematic configuration of the processor according to a third embodiment of the invention.

FIG. 4 is a block diagram showing a general configuration of the processor according to a third embodiment of the invention. In the processor according to this embodiment, as compared with the processor according to the first embodiment shown in FIG. 2, only the internal structure of conversion table 13 is different. The component parts of the configuration and functions similar or identical to those of the first embodiment, therefore, are not described in detail again.

Conversion table 13 includes a SRAM (static random access memory) and an associative memory 24. The 4-bit pre-conversion code output from instruction queue 12 is applied as an address of memory 24. Memory 24 has a width of 32 bits and a plurality of instruction codes are stored in each memory area.

A computer not shown is assumed to write a plurality of instruction codes sequentially in memory 24 through data bus 23 by outputting a plurality of the instruction codes to data bus 23 while controlling the address.

As explained above, in the processor according to this embodiment, conversion table 13 is configured of memory 24, and therefore, in addition to the effects described in the first embodiment, the hardware configuration can be simplified and reduced in size.

Fourth Embodiment

The processor according to a fourth embodiment of the invention is different from the processor according to the first embodiment shown in FIG. 2 only in that the data bus of the processor is connected to data bus 23. The component parts of the configuration and functions similar or identical to those of the aforementioned embodiments, therefore, are not described in detail again.

The processor writes a plurality of instructions in conversion table 13 through data bus 23 as a bus master at a predetermined timing such as resetting. In the process, until a plurality of the instructions are completely written in conversion table 13, the processor executes the process with the pack valid bit set to invalid "0" according to the program, and upon completion of writing the plurality of the instructions in conversion table 13, the execution of the packed instructions becomes possible.

As explained above, the processor according to this embodiment writes a plurality of instruction codes in conversion table 13 by itself as a bus master. In addition to the effects explained in the first embodiment, therefore, a plurality of instruction codes are not required to be transferred to conversion table 13 from an external source, and the processor can execute the process by itself.

Fifth Embodiment

The first embodiment, as shown in FIG. 1, is so configured that the instruction code includes packed and non-packed instructions. According to this embodiment, on the other hand, the instruction code includes only packed instructions. Therefore, the instruction code contains no pack valid bit.

Figure 5:
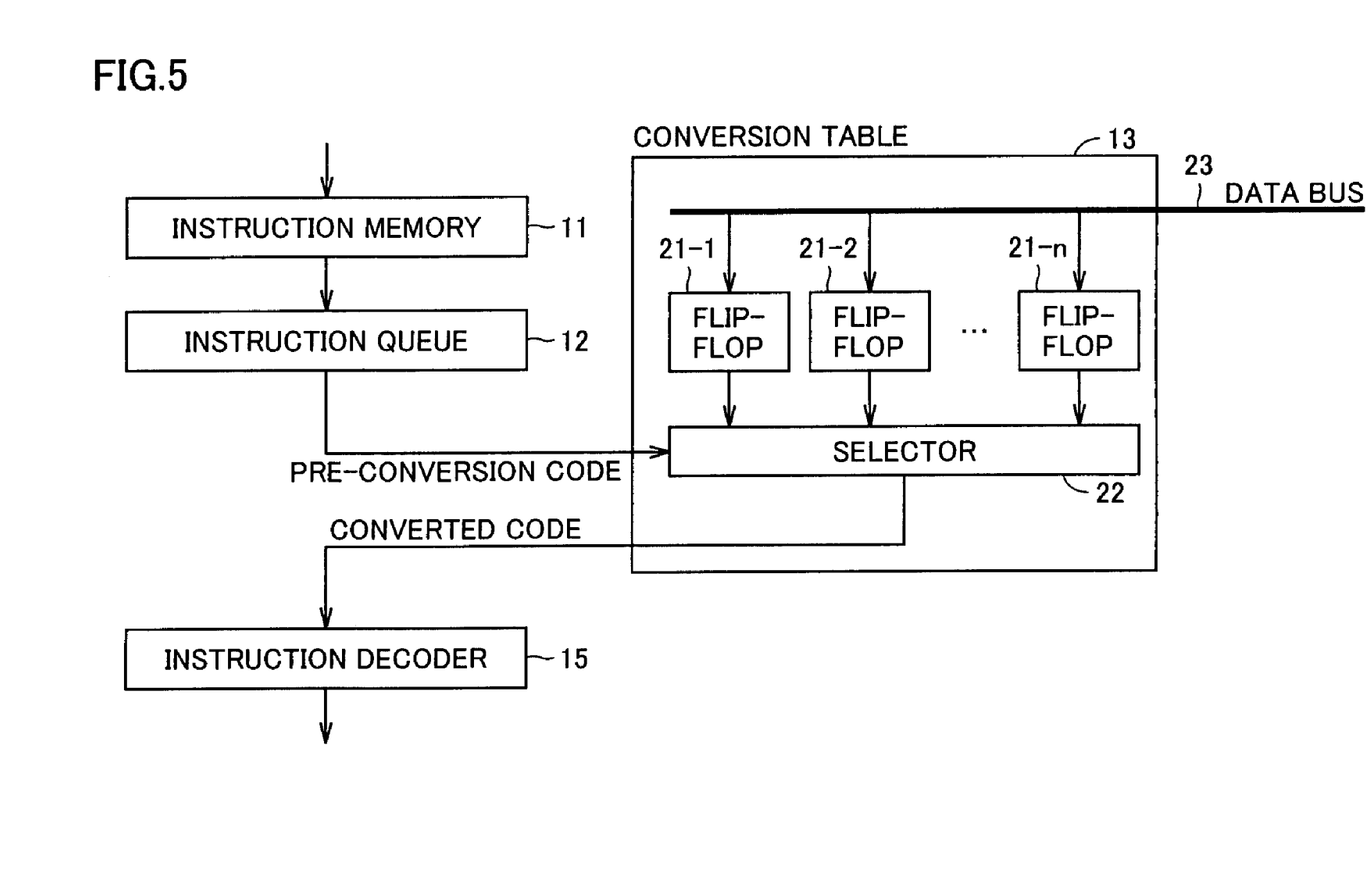
FIG. 5 is a block diagram showing a schematic configuration of the processor according to a fifth embodiment of the invention.

FIG. 5 is a block diagram showing a general configuration of the processor according to a fifth embodiment of the invention. The processor according to this embodiment is different from the processor according to the first embodiment shown in FIG. 2 only in that instruction selector 14 is eliminated, the output of selector 22 is applied directly to instruction decoder 15 and that the block in instruction decoder 15 for decoding the non-packed instructions is deleted. The component parts of the configuration and functions similar or identical to those of the aforementioned embodiments, therefore, are not described in detail again.

As explained above, in the processor according to this embodiment, the instruction code includes only the packed instruction. In addition to the effects described in the first embodiment, therefore, the number of bits of the packed instruction can be increased and a greater number of instruction sets can be packed, thereby making it possible to execute a greater number of instructions in parallel.

Sixth Embodiment

In the first embodiment, a plurality of the instructions written in conversion table 13 contain an operand. According to the sixth embodiment, on the other hand, the instructions written in conversion table 13 contain no operand but only the operation code is packed.

The processor according to this embodiment has a general configuration similar to that of the first embodiment shown in FIG. 2. Nevertheless, the operand of the instructions to be packed is included in the instruction code stored in instruction queue 12. Instruction decoder 15 decodes the particular operand and applies the decoding result to ALUs 17-1 to 17-4.

Conversion table 13 outputs a plurality of the instruction codes containing only the operation code to instruction selector 14. Instruction decoder 15 decodes the operation code of the instruction code received from instruction selector 14 and applies the decoding result to ALUs 17-1 to 17-*n*.

As explained above, in the processor according to this embodiment, the operand is not stored in flip-flops 21-1 to 21-*n* in conversion table 13. In addition to the effects explained in the first embodiment, therefore, the circuit size of conversion table 13 can be further reduced.

Seventh Embodiment

Figure 6:
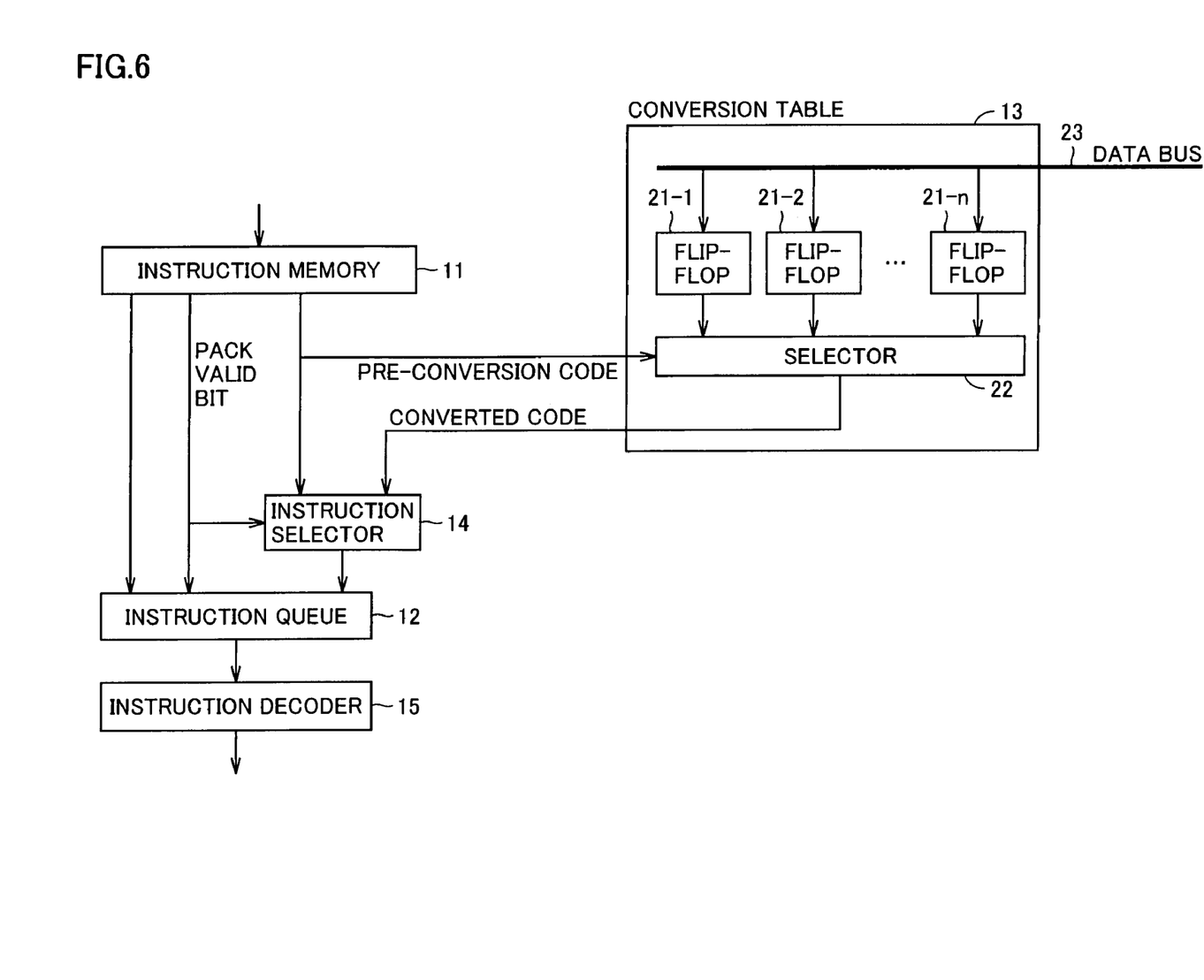
FIG. 6 is a block diagram showing a schematic configuration of the processor according to a seventh embodiment of the invention.

FIG. 6 is a block diagram showing a general configuration of the processor according to a seventh embodiment of the invention. The processor according to this embodiment is different from the processor according to the first embodiment shown in FIG. 2 only in that conversion table 13 is interposed between instruction memory 11 and instruction queue 12. The component parts of the configuration and functions similar or identical to those of the aforementioned embodiments, therefore, are not described in detail again.

The packed instruction contained in the instructions fetched from instruction memory 11 is applied to conversion table 13 as a 4-bit pre-conversion code on the one hand and to instruction selector 14 on the other hand. The remaining 12 bits are applied directly to instruction queue 12.

The 32-bit converted code selected by selector 22 is applied to instruction selector 14. In the case where the pack valid bit is a valid "1", instruction selector 14 selects the 32-bit converted code received from selector 22 and outputs it to instruction queue 12, while in the case where the pack valid bit is an invalid "0", on the other hand, the 4-bit packed instruction is selected and output to instruction queue 12.

Instruction queue 12 outputs the instruction code held therein to instruction decoder 15 and causes instruction decoder 15 to decode it at a predetermined timing.

As explained above, in the processor according to this embodiment, conversion table 13 is interposed between instruction memory 11 and instruction queue 12. In addition to the effects explained in the first embodiment, therefore, the delay time before the instruction code is transferred from instruction queue 12 to instruction decoder 15 and decoded is shortened. In the case where the delay time before the instruction code is transferred from instruction queue 12 to instruction decoder 15 and decoded constitutes the critical path of the processor as a whole, the overall operating frequency of the processor can be improved.

Eighth Embodiment

Figure 7:
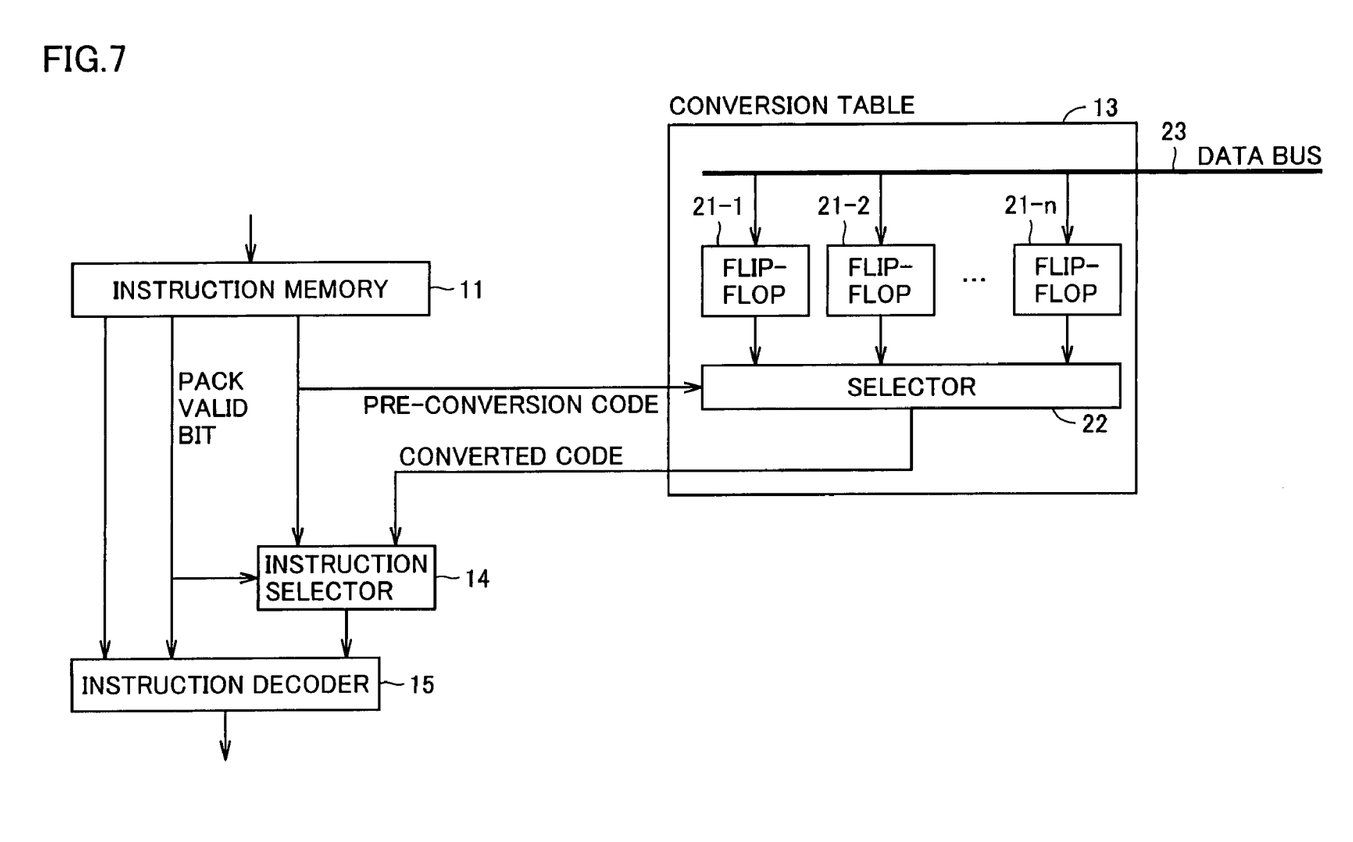
FIG. 7 is a block diagram showing a schematic configuration of the processor according to an eighth embodiment of the invention.

FIG. 7 is a block diagram showing a general configuration of the processor according to an eighth embodiment of the invention. The processor according to this embodiment is different from the processor according to the first embodiment shown in FIG. 2 only in that instruction queue 12 is deleted. The component parts of the configuration and functions similar or identical to those of the aforementioned embodiments, therefore, are not described in detail again.

The packed instruction contained in the instructions fetched from instruction memory 11 is applied to conversion table 13 as a 4-bit pre-conversion code on the one hand and applied to instruction selector 14 at the same time. The remaining 12 bits are applied directly to instruction decoder 15.

The 32-bit converted code selected by selector 22 is applied to instruction selector 14. In the case where the pack valid bit is a valid "1", instruction selector 14 selects the 32-bit converted code received from selector 22 and outputs it to instruction decoder 15, while in the case where the pack valid bit is an invalid "0", on the other hand, the 4-bit packed instruction is selected and output to instruction decoder 15.

As explained above, in the processor according to this embodiment, instruction queue 12 is deleted, and therefore, in addition to the effects described in the first embodiment, the circuit size of the whole processor can be reduced.

Ninth Embodiment

According to the ninth embodiment, unlike in the first embodiment in which a plurality of packed instruction codes are processed in parallel, a plurality of packed instruction codes are serially processed.

The general configuration of the processor according to this embodiment is similar to that of the processor according to the first embodiment shown in FIG. 1. Nevertheless, a predetermined bit of the packed instruction indicates parallel or serial execution, and instruction selector 14 changes the process by reference to the particular predetermined bit.

In the case where the packed instruction indicates the parallel execution, instruction selector 14 outputs the 32-bit converted code from selector 22 to instruction decoder 15 at a time. In the case where the packed instruction indicates the serial execution, on the other hand, instruction selector 14 serially outputs the 32-bit converted code from selector 22 in a plurality of cycles.

In the case where 4 instruction codes are output from selector 22, for example, the instruction codes are sequentially output to instruction decoder 15 in 4 cycles, and the instruction decoder 15 decodes the 4 instructions sequentially. The decoding result is continuously applied to one of ALUs 17-1 to 17-4.

As explained above, in the processor according to this embodiment, a plurality of packed instruction codes are processed serially. In addition to the effects explained in the first embodiment, therefore, the instructions serially executed can be also packed, thereby making it possible to further improve the instruction compression efficiency.

Tenth Embodiment

Figure 8:
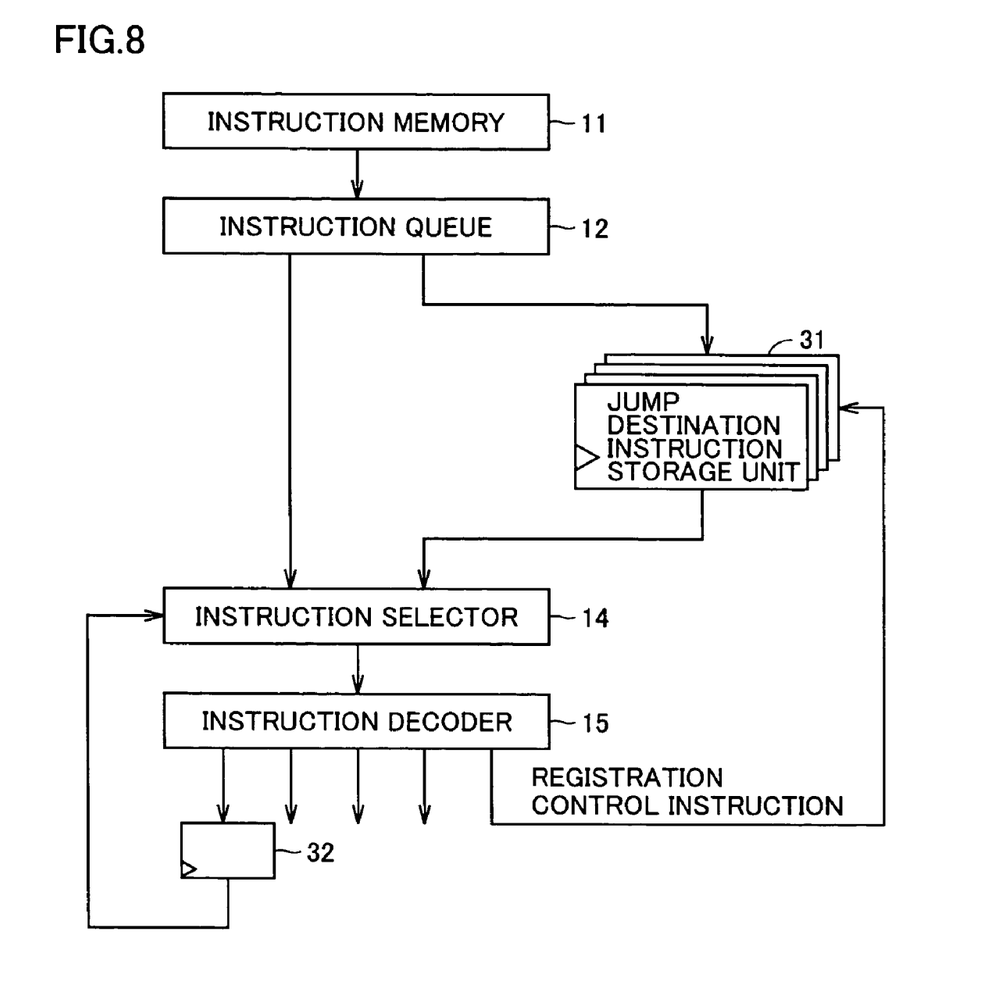
FIG. 8 is a block diagram showing a schematic configuration of the processor according to a tenth embodiment of the invention.

FIG. 8 is a block diagram showing a general configuration of the processor according to a tenth embodiment of the invention. The processor according to this embodiment, as compared with the processor according to the first embodiment shown in FIG. 1, includes a jump destination instruction storage unit 31 for registering the instruction of the jump destination and a flip-flop 32 for holding the address of the jump destination.

Assume that the jump instruction free of penalty is decoded by instruction decoder 15 during execution of a program by the processor. An instruction registration control signal is output to jump destination instruction storage unit 31. The jump instruction free of penalty is assumed to include an unconditional branch instruction or a conditional branch instruction satisfying the branch conditions.

In the case where a jump destination instruction is stored in instruction queue 12, jump destination instruction storage unit 31 holds the particular jump destination instruction. In the case where instruction decoder 15 decodes a jump instruction free of penalty, flip-flop 32 holds the jump destination address output from instruction decoder 15. Instruction selector 14, by reference to the jump destination address held in flip-flop 32, stores the correspondence between the jump destination address and the jump destination instruction held in jump destination instruction storage unit 31. In the case where a jump instruction free of penalty is decoded by instruction decoder 15, a similar process is executed if the particular jump destination instruction is not held in jump destination storage unit 31.

Next, assume that in the case where instruction decoder 15 decodes a jump instruction free of penalty, instruction selector 14 determines that a jump destination instruction corresponding to the jump destination address held in flip-flop 32 is held in jump destination instruction storage unit 31. The particular jump destination instruction is read from jump destination instruction storage unit 31 and output to instruction decoder 15. In the process, the address of the instruction next to the jump destination instruction is applied to a program counter not shown.

Figure 9:
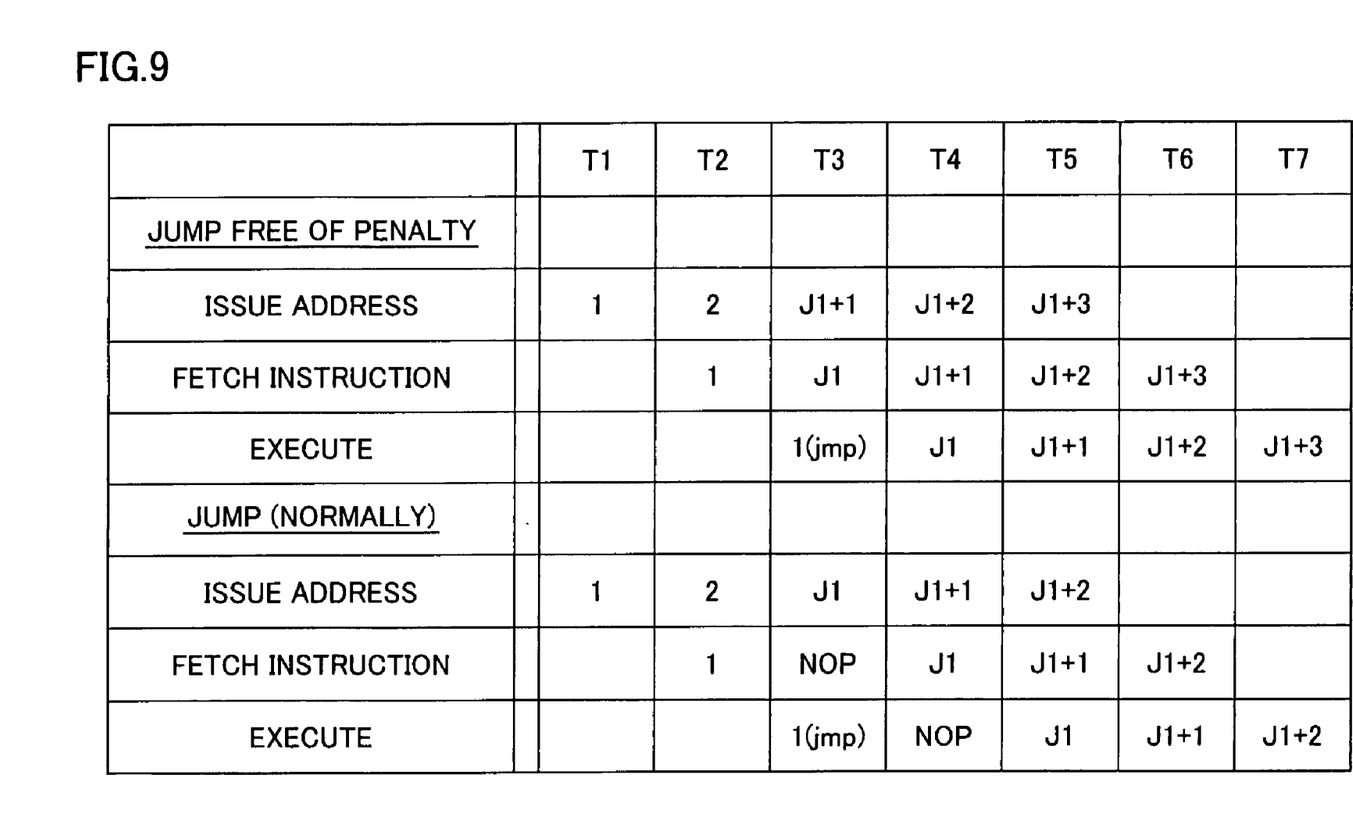
FIG. 9 is a diagram for explaining the pipelining process executed by the processor at the time of jumping according to the tenth embodiment.

FIG. 9 is a diagram for explaining the pipelining process executed by the processor at the time of jump according to the tenth embodiment of the invention. The upper half of FIG. 9 shows the jump process according to this embodiment, in which the address of instruction 1 is issued in cycle T1 and the address of instruction 2 is issued in cycle T2 while at the same time instruction 1 is fetched. Instruction 1 is a jump instruction free of penalty.

In cycle T3, a jump instruction free of penalty is decoded by instruction decoder 15, and instruction selector 14, by referring to the jump destination address held in flip-flop 32, reads the jump destination instruction from jump destination instruction storage unit 31 and outputs it to instruction decoder 15. In the process, the address of the instruction next to the jump destination instruction is applied to a program counter not shown, and this address is issued.

In cycle T4, the jump destination instruction is executed, the instruction next to the jump destination instruction is fetched, while at the same time the address of the next instruction but one is issued. In cycle T5 and subsequent cycles, a similar pipelining process is executed.

The instruction next to the jump instruction is stored in instruction queue 12. Even in the case where the branch conditions of the conditional branch instruction fail to be met, therefore, the pipelining process similar to that shown in the upper half of FIG. 9 can be carried out by applying the particular instruction to instruction decoder 15.

The lower half of FIG. 9, on the other hand, indicates the conventional jump process. In cycle T1, the address of instruction 1 is issued, and in cycle T2, the address of instruction 2 is issued while at the same time instruction 1 is fetched. Instruction 1 is a jump instruction requiring the branch prediction.

In cycle T3, a jump instruction is decoded by instruction decoder 15. In this case, it is assumed that the branch prediction fails and the instruction of the branch destination is required to be fetched again. In this cycle, the instruction stored in instruction queue 12 is invalidated and processed as a NOP (non-operation) instruction.

In cycle T4, the NOP instruction is executed and the jump destination instruction is fetched, while at the same time the address of the instruction next to the jump destination instruction is issued. In cycle T5 and subsequent cycles, a similar pipelining process is executed. In this way, a one-cycle delay occurs as compared with the jump instruction free of penalty.

Even in the case of a jump instruction free of penalty, the jump destination instruction may be required to be fetched, as shown in the lower half of FIG. 9, unless the jump instruction is held in jump destination instruction storage unit 31. In such a case, a one-cycle delay occurs.

As explained above, with the processor according to this embodiment, in the case where a jump destination instruction is held in jump destination instruction storage unit 31, the particular jump destination instruction is applied to instruction decoder 15. Thus, the penalty in the cycle of jump can be eliminated, and the delay due to the irregularities of the pipeline is prevented.

Specifically, according to the prior art including the branch prediction, a failure of the branch prediction results in the requirement of a repeated instruction fetch, and therefore a jump penalty occurs. In the processor according to this embodiment, on the other hand, no jump penalty occurs as long as a jump destination instruction is held in jump destination instruction storage unit 31.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor comprising:
   an instruction memory for storing a plurality of instructions, each instruction including a first part as an instruction code and a second part that indicates a status of the instruction;
   a converter for converting a packed instruction contained in the instruction code in the first part of the instruction fetched from the instruction memory into a plurality of instruction codes when the second part of the instruction indicates a first status;
   a decoder for decoding the plurality of instruction codes converted by the converter when the second part of the instruction indicates the first status, and for decoding the instruction code in the first part of the instruction when the second part of the instruction indicates a second status; and
   a plurality of operation units for operating each of the plurality of instruction codes in accordance with a decoding result of the decoder.

2. The processor according to claim 1, wherein
   the converter includes:
   a plurality of flip-flops for storing a plurality of different sets of instruction codes; and
   a selector for selecting a set of a plurality of instruction codes stored in the plurality of flip-flops in accordance with the packed instruction and outputting the selected set of the plurality of instruction codes to the decoder.

3. The processor according to claim 1, wherein
   the converter includes a memory for storing different sets of a plurality of instruction codes in respective areas, and selectively outputting a set of a plurality of instruction codes by using the packed instruction as an address.

4. The processor according to claim 1, wherein
   the converter is connected to a data bus connected with an external device, and a plurality of instruction codes are written by the external device through the data bus.

5. The processor according to claim 4,
   wherein a set of a plurality of instruction codes determined as high in the frequency of occurrence by a compiler implemented by the external device is written in the converter.

6. The processor according to claim 1, wherein
   the converter is connected to a data bus of the processor, and a set of a plurality of instruction codes is written in the converter by the processor.

7. The processor according to claim 1, further comprising an instruction queue interposed between the instruction memory and the converter.

8. The processor according to claim 1, further comprising:
   a selector for selectively outputting the plurality of instruction codes converted by the converter and the packed instruction to the decoder in accordance with a predetermined bit of the fetched instruction code.

9. The processor according to claim 8, further comprising:
an instruction queue interposed between the selector and the decoder.

10. The processor according to claim 8, wherein
the selector serially outputs the plurality of instruction codes converted by the converter to the decoder, and
the decoder decodes the plurality of instruction codes one by one and outputs a decoding result to a predetermined one of the plurality of operation units.

11. The processor according to claim 8, wherein
the fetched instruction code contains information indicating whether a parallel or serial execution is carried out, and
the selector determines, in accordance with the information, whether the plurality of instruction codes are output to the decoder in parallel or serially.

12. The processor according to claim 8, further comprising:
a jump destination instruction storage unit for storing a jump destination instruction; and
a holder for holding an address of the jump destination instruction, wherein
in the case where the decoder decodes a jump instruction free of penalty, the selector acquires the jump destination instruction held in the jump destination instruction storage unit, corresponding to the address of the jump destination instruction held in the holder and outputs the acquired jump destination instruction to the decoder.

13. The processor according to claim 1, wherein
the converter converts only the operation code of the plurality of instruction codes, and
an operand of the plurality of instruction codes is included in the instruction code fetched from the instruction memory.

* * * * *